US009977741B2

(12) United States Patent
Pricopi et al.

(10) Patent No.: US 9,977,741 B2
(45) Date of Patent: May 22, 2018

(54) FUSIBLE AND RECONFIGURABLE CACHE ARCHITECTURE

(71) Applicants: Huawei Technologies Co., Ltd., Shenzhen (CN); National University of Singapore, Singapore (SG)

(72) Inventors: Mihai Pricopi, Singapore (SG); Zhiguo Ge, Singapore (SG); Yuan Yao, Singapore (SG); Tulika Mitra, Singapore (SG); Naxin Zhang, Singapore (SG)

(73) Assignees: Huawei Technologies Co., Ltd., Shenzhen (CN); National University of Singapore, Singapore (SG)

( * ) Notice: Subject to any disclaimer, the term of this patent is extended or adjusted under 35 U.S.C. 154(b) by 0 days. days.

(21) Appl. No.: 15/208,295

(22) Filed: Jul. 12, 2016

(65) Prior Publication Data

US 2016/0321177 A1 Nov. 3, 2016

Related U.S. Application Data

(63) Continuation of application No. 14/183,238, filed on Feb. 18, 2014, now Pat. No. 9,460,012.

(51) Int. Cl.
*G06F 12/08* (2016.01)
*G06F 12/0813* (2016.01)
(Continued)

(52) U.S. Cl.
CPC ........ *G06F 12/0813* (2013.01); *G06F 12/084* (2013.01); *G06F 12/0815* (2013.01);
(Continued)

(58) Field of Classification Search
CPC ............. G06F 12/0831; G06F 11/0727; G06F 11/0772; G06F 11/201; G06F 11/2089;
(Continued)

(56) References Cited

U.S. PATENT DOCUMENTS

| | | | |
|---|---|---|---|
| 7,788,334 B2 | 8/2010 | Blumrich et al. | |
| 9,612,934 B2 * | 4/2017 | Dobbie | G06F 11/3495 |

(Continued)

FOREIGN PATENT DOCUMENTS

| | | |
|---|---|---|
| CN | 101751280 A | 6/2010 |
| CN | 101753388 A | 6/2010 |
| CN | 103020003 A | 4/2013 |

OTHER PUBLICATIONS

Rahimi et al., "A Fully-Synthesizable Single-Cycle Interconnection Network for Shared-L 1 Processor Clusters," 2011 Design, Automation & Test in Europe, Grenoble, France, pp. 1-6, Institute of Electrical and Electronics Engineers, New York, New York (Mar. 14-18, 2011).

(Continued)

*Primary Examiner* — Zhuo Li

(74) *Attorney, Agent, or Firm* — Leydig, Voit & Mayer, Ltd.

(57) ABSTRACT

A reconfigurable cache architecture is provided. In processor design, as the density of on-chip components increases, a quantity and complexity of processing cores will increase as well. In order to take advantage of increased processing capabilities, many applications will take advantage of instruction level parallelism. The reconfigurable cache architecture provides a cache memory that in capable of being configured in a private mode and a fused mode for an associated multi-core processor. In the fused mode, individual cores of the multi-core processor can write and read data from certain cache banks of the cache memory with greater control over address routing. The cache architecture further includes control and configurability of the memory size and associativity of the cache memory itself.

2 Claims, 7 Drawing Sheets

(51) Int. Cl.
*G06F 12/084* (2016.01)
*G06F 12/0815* (2016.01)
*G06F 12/0842* (2016.01)

(52) U.S. Cl.
CPC .. *G06F 12/0842* (2013.01); *G06F 2212/1016* (2013.01); *G06F 2212/1021* (2013.01); *G06F 2212/1024* (2013.01); *G06F 2212/1028* (2013.01); *G06F 2212/601* (2013.01); *G06F 2212/6012* (2013.01); *G06F 2212/6042* (2013.01); *Y02B 60/1225* (2013.01)

(58) Field of Classification Search
CPC ............ G06F 12/0813; G06F 12/0817; G06F 12/084; G06F 15/16; G06F 15/17337; G06F 3/0613; G06F 3/0635; G06F 3/067; G06F 9/383; G06F 9/3851
See application file for complete search history.

(56) References Cited

U.S. PATENT DOCUMENTS

| | | | |
|---|---|---|---|
| 2004/0205288 A1* | 10/2004 | Ghaffari | G06F 3/0613 711/100 |
| 2006/0143384 A1 | 6/2006 | Hughes et al. | |
| 2008/0320268 A1* | 12/2008 | Wingard | G06F 12/0607 711/202 |
| 2010/0110934 A1 | 5/2010 | Li et al. | |
| 2010/0274975 A1 | 10/2010 | Sistla et al. | |
| 2010/0287357 A1 | 11/2010 | Vishkin | |
| 2011/0231616 A1 | 9/2011 | Lin | |
| 2012/0311266 A1 | 12/2012 | Takata | |

OTHER PUBLICATIONS

Ipek et al., "Core Fusion: Accomodating Software Diversity in Chip Multiprocessors," International Symposium on Computer Architecture, San Diego, California, Association for Computing Machinery, New York, New York (Jun. 9-13, 2007).
Khubaib et al., "MorphCore: An Energy-Efficient Microarchitecture for High Performance ILP and High Throughput TLP," 45th Annual IEEE/ACM International Symposium on Microarchitecture, Vancouver, British Columbia, pp. 305-316, Institute of Electrical and Electronics Engineers, New York, New York (Dec. 1-5, 2012).
Kim et al., "Composable Lightweight Processors," 40th Annual IEEE/ACM International Symposium on Microarchitecture, Chicago, Illinois, pp. 381-394, Institute of Electrical and Electronics Engineers, New York, New York (Dec. 1-5, 2007).
Pricopi et al., "Bahurupi: A Polymorphic Heterogeneous Multi-Core Architecture," ACM Transactions on Architecture and Code Optimization, vol. 8, Issue 4, Association for Computing Machinery, New York, New York (Jan. 2012).
Tarjan et al., "Federation: Repurposing Scalar Cores for Out-of-Order Instruction Issue," Proceedings of the 45th Annual Design and Automation Conference, Anaheim, California, pp. 772-775, Association for Computing Machinery, New York, New York (Jun. 8-13, 2008).
CN 201510083708.2, Office Action, dated Aug. 2, 2017.
U.S. Appl. No. 14/183,238, filed Feb. 18, 2014.

* cited by examiner

FUSIBLE AND RECONFIGURABLE CACHE ARCHITECTURE

CROSS-REFERENCE TO RELATED APPLICATION

This application is a continuation of U.S. patent application Ser. No. 14/183,238, filed on Feb. 18, 2014. The afore-mentioned patent applications are hereby incorporated by reference in their entireties.

BACKGROUND OF THE INVENTION

As on chip transistor density increases according to Moore's Law, a capability to design reliable multi-core processors operating with abundant parallelism is increasing as well. Indeed, modern multi-core architectures integrate many homogeneous simple cores on a same die, which favors exploitation of Thread Level Parallelism (TLP). However, while TLP may be exploited, many applications operating on a typical multi-core processor have a significant amount of sequential code fragments. Amdahl's Law states such applications suffer from poor speedup while operating on a multi-core processor because the sequential code fragments cannot exploit Instruction Level Parallelism (ILP) among the cores of the multi-core processor.

To solve the above problem certain adaptive multi-core architectures such as those disclosed in Mihai Pricopi and Tulika Mitra. Bahurupi: A Polymorphic Heterogeneous Multi-core Architecture. ACM TACO, 8(4):22:1-22:21, 2012; Engin Ipek et al. Core Fusion: Accommodating Software Diversity in Chip Multiprocessors. ISCA, pages 186-197, 2007; David Tarjan et al. Federation: Repurposing Scalar Cores for Out-of-order Instruction Issue. DAC, pages 772-775, 2008; and Changkyu Kim et al. Composable Lightweight Processors. MICRO, pages 381-394, 2007, have been proposed to solve the above mentioned limitations of simple cores. In general, the multi-core architectures discussed in the cited documents create virtual complex cores out of simple cores, where the virtual complex cores are capable of accelerating sequential fragments of the applications being executed by the multi-core processor by exploiting ILP. These adaptive multi-core processors offer far better performance compared to both classic homogeneous multi-cores and asymmetric multi-cores when a mixture of sequential and parallel applications co-exist in a processors workload.

The proposed adaptive multi-core processor designs discussed in the above cited documents primarily focus on an internal micro-architecture of the processor, a compiler for the processor, and a programming model. Consequently, the described multi-core processor designs ignore or make a simplifying assumption regarding a memory hierarchy for the multi-core processor. For instance, a common assumption in the above cited documents is that a first level data instruction cache must support reconfigurability. However, none of the above cited documents provides a solution to the need for reconfigurable cache architecture for adaptive multi-core processors.

BRIEF SUMMARY OF THE INVENTION

In one aspect, embodiments of the invention provide a reconfigurable cache architecture comprising: a multi-core processor comprising a plurality of cores; a plurality of cache memories configured to store data processed by at least one of the plurality of cores and to provide the stored data to at least one of the plurality of cores upon request; and an interconnect network configured to connect at least one core of the plurality of cores to at least one cache memory of the plurality of cache memories; wherein the interconnect network comprises a combinational routing network, and the data processed by at least one of the plurality of cores is routed through the combination routing network based on an address mapping input to the interconnect network.

In one embodiment, the combination routing network comprises a network reconfiguration input including and at least one switching layer, wherein the at least one switching layer comprises a plurality of configurable switches configured to operate in one of a bidirectional mode, an always up mode and an always down mode.

In another embodiment, the combination routing network is configured to operate in the bidirectional mode and the address mapping determines whether the data processed by at least one of the plurality of cores is routed a first direction or a second direction.

In yet another embodiment, the data processed by at least one of the plurality of cores is stored in an individual cache bank of the at least one cache memory of the plurality of cache memories based on whether it was routed the first direction or the second direction.

In one embodiment, the interconnect network further comprises an arbitration stage interposed between the combination routing network and the at least one cache memory of the plurality of cache memories.

In another embodiment, if more than one core is writing data to the individual cache bank at a same time, the arbitration stage is configured to determine which of the data is actually written to the individual cache bank.

In yet another embodiment, the reconfigurable cache architecture further includes a direct connection network connecting one core of the plurality of cores to one cache memory of the plurality of cache memories; and a system reconfiguration input configured to select between the interconnect network and the direct connection network for each core of the plurality of cores such that the data processed by at least one of the plurality of cores is routed through one of the interconnect network and the direct connection network based on a state of the system reconfiguration input.

In another embodiment, the reconfigurable cache architecture further includes an individual multiplexer interposed between each of the cores on a first side of the multiplexer and the interconnect network and the direct network on a second side of the multiplexer.

In yet another embodiment, the multiplexer is configured to select one of the direct connection network and the interconnect network based on the state of the system reconfiguration input.

In one embodiment, each individual cache memory of the plurality of cache memories comprises a plurality of cache banks connected in an H-bridge formation with a first switch, a second switch, a third switch and a fourth switch connecting the direct connection network to the plurality of cache banks.

In another embodiment, the reconfigurable cache architecture further includes a cache reconfiguration input configured to open or close the first switch, the second switch, the third switch and the fourth switch based on whether the system reconfiguration input has selected the direct connection network or the interconnect network.

In yet another embodiment, if the system reconfiguration input is configured to select the direct connection network, then the cache reconfiguration input closes the first switch, the second switch, the third switch and the fourth switch;

and if the system reconfiguration input is configured to select the interconnect network, then the cache reconfiguration input opens the first switch, the second switch, the third switch and the fourth switch.

In another aspect, embodiments of the invention provide a system for configuring a cache memory request routing for implementing instruction level parallelism in a multi-core processor, the system comprising: a plurality of cores of the multi-core processor configured to perform instruction level parallel processing on data processed by the multi-core processor; a plurality of cache memories configured to store the data processed by the multi-core processor and to provide the stored data to at least one of the plurality of cores upon request; a direct connection network connecting one core of the plurality of cores to one cache memory of the plurality of cache memories; and an interconnect network configured to connect at least one core of the plurality of cores to at least one cache memory of the plurality of cache memories, wherein the interconnect network comprises a combination routing network, and the data processed by the multi-core processor is routed through the combination routing network based on an address mapping input to the interconnect network.

In one embodiment, the system for configuring a cache memory further includes a system reconfiguration input, wherein the system reconfiguration input configures the data processed by the multi-core processor to be routed over one of the direct connection network and the interconnect network.

In another embodiment, the combination routing network comprises: at least one switching layer comprising a plurality of configurable switches configured to operate in one of a bidirectional mode, an always up mode and an always down mode, and a network reconfiguration input configured to input the address mapping such that the data processed by the multi-core processor is routed through the at least one switching layer according to the address mapping and written to a specified cache bank of the at least one cache memory of the plurality of cache memories.

In yet another embodiment, each individual cache memory of the plurality of cache memories comprises a plurality of cache banks connected in an H-bridge formation with at least one switch connecting the direct connection network to the plurality of cache banks.

In a further embodiment, each of the individual cache memories of the plurality of cache memories comprises a cache reconfiguration input configured to open or close the at least one switch based on whether the system reconfiguration input has selected the direct connection network or the interconnect network, wherein if the system reconfiguration input is configured to select the direct connection network, then the cache reconfiguration input closes the at least one switch, and if the system reconfiguration input is configured to select the interconnect network, then the cache reconfiguration input opens the at least one switch.

In another aspect, embodiment of the invention provide an interconnect device configured to communicatively couple a multi-core processor to a plurality of cache memories each comprising a plurality of cache banks, the interconnect device comprising: a log network layer comprising a plurality of switching layers, wherein a first switching layer comprises a plurality of switches and each subsequent switching layer comprises twice as many switches as the previous switching layer; a network reconfiguration register configured to store an address mapping for routing data processed by the multi-core processor through the log network layer; and an arbitration layer coupling the log network layer to the plurality of cache banks.

In one embodiment, the address mapping comprises a binary number where each digit of the binary number corresponds to an individual switching layer of the plurality of switching layers, and each switch of the individual switching layer is configured to route the data processed by the multi-core processor one of a first direction and a second direction to the subsequent switching layer based on a value of the digit corresponding to the individual switching layer.

In another embodiment, the arbitration layer comprises an individual arbitration node for each cache bank of the plurality of cache banks, and each of the individual arbitration nodes has one input for each core of the multi-core processor and one output to the cache bank.

In yet another embodiment, the individual arbitration node is configured to determine what data is written to the cache bank in the event that more than one core of the multi-core processor attempts to write the data to the cache bank at the same time.

BRIEF DESCRIPTION OF THE SEVERAL VIEWS OF THE DRAWING(S)

DETAILED DESCRIPTION OF THE INVENTION

Embodiments of the invention described herein provide a fusible and reconfigurable cache architecture for an adaptive multi-core processor. The fusible and reconfigurable cache architecture is able to switch between at least two modes of operation. The two modes are a private mode for use while the multi-core processor is functioning as a traditional multi-core processor and a fused mode for use while the multi-core processor is functioning as an adaptive multi-core processor. While in the fused mode, the adaptive multi-core processor is able to configure the shared cache size and associativity of the shared cache for each core of the multi-core processor. This functionality enables optimal efficiency in terms of energy consumption, cache miss rate and read/write performance.

Figure 1:
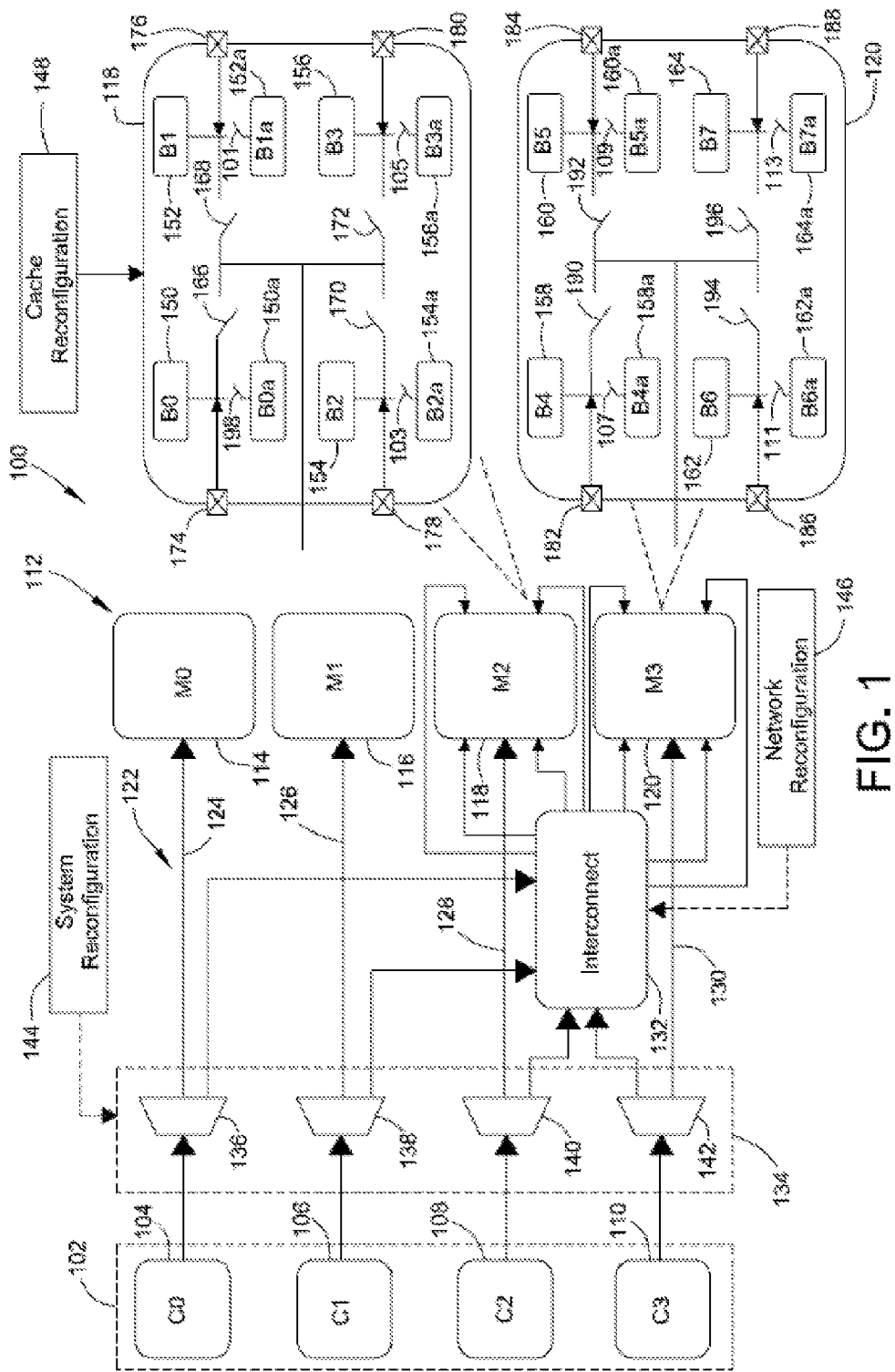
FIG. 1 is an illustration of a cache architecture for an adaptive multi-core processor according to an embodiment of the invention.

Turning now to FIG. 1, a reconfigurable cache architecture 100 for use with a multi-core processor 102 operating in either a traditional or adaptive/fused mode is illustrated. The multi-core processor 102 includes a plurality of processing cores, which are illustrated as C0-C3 104, 106, 108 and 110. As an aside, the embodiment illustrated in FIG. 1 only shows four cores, but in other embodiments, more or less cores may be included within the multi-core processor 102.

Cache architecture 100 further includes cache modules or cache memories 112, which are illustrated as M0-M3 114, 116, 118 and 120. In the embodiment illustrated in FIG. 1, there is illustrated one cache memory 114, 116, 118 and 120 for each core 104, 106, 108 and 110. Further, each of cores 104, 106, 108 and 110 are directly connected to its corresponding cache memory 114, 116, 118 and 120, respectively, through a direct connection network 122. Direct connection network 122 includes direct connections 124, 126, 128 and 130 that connect to cache memories 114, 116, 118 and 120, respectively.

Each core 104, 106, 108 and 110 are shown to further connect to cache memories 112 through an interconnect network 132. In the embodiment illustrated in FIG. 1, the interconnect network 132 is illustrated as only connecting cores 104, 106, 108 and 110 to cache memories 118 and 120. However, in other embodiments, more or less of the individual cache memory, such as memories 114 and 116 may be included.

The multi-core processor 102 will communicate with cache memory 112 through either the direct connection network 122 or the interconnect network 132 based on a state of a switch network 134, which in the embodiment illustrated in FIG. 1 is shown as a network of switches in the form of multiplexers 136, 138, 140 and 142. The state of the multiplexers 136, 138, 140 and 142 is controlled by a system reconfiguration input 144. Based on the system reconfiguration input 144, the multiplexers 136, 138, 140 and 142 will route data over either the direct connection network 122 or the interconnect network 132.

When the switch network 134 is configured such that the multi-core processor 102 writes/reads data over the direct connection network 122, the cache architecture 100 is configured to operate in private mode. And when the switch network 134 is configured such that the multi-core processor 102 writes/reads data over the interconnect network 132, the cache architecture 100 is configured to operate in fused mode. Accordingly, the system reconfiguration input 144 controls whether the cache architecture 100 operates in either its private or fused mode. In this regard, the system reconfiguration input 144 controls a first configuration level of the overall cache architecture 100.

In the embodiment illustrated in FIG. 1, the cache architecture 100 includes two further configuration levels. A second configuration level is controlled by a network reconfiguration input 146. This second configuration level controls a reconfiguring process for the interconnect network 132 such that the write/read data is routed to/from a specified cache bank within cache memory 118 or 120 when the multi-core processor is operating in the fused mode.

As an aside, the interconnect network 132 illustrated in the figures herein show only a connection from the multi-core processor 102 to the cache memories 112. For the purpose of clarity of the illustrations, a corresponding interconnect network is not illustrated for the data returned to the multi-core processor 102 during a read from the cache memories 112. As the read process is similar to the write process, but in reverse, the description contained herein for the write process will be sufficient to understand the read process.

A third configuration level is controlled by a cache reconfiguration input 148. This input controls a set of switches within an individual cache memory, illustrated in a detailed view of cache memories 118 and 120 in FIG. 1. The detailed view of cache memories 118 and 120 illustrate eight cache banks B0-B7 150, 152, 154, 156, 158, 160, 162 and 164 and B0a-B7a 150a, 152a, 154a, 156a, 158a, 160a, 162a and 164a connected in an H-bridge formation. The H-bridge formation includes four switches 166, 168, 170 and 172 in cache memory 118 and four switches 190, 192, 194 and 196 in cache memory 120. When the eight switches 166, 168, 170, 172, 190, 192, 194 and 196 are closed they connect the cache banks B0-B7 150, 152, 154, 156, 158, 160, 162 and 164 to the direct connection 128 and 130 and thereby configure cache memories 118 and 120 to operate in the private mode. And when the eight switches 166, 168, 170, 172, 190, 192, 194 and 196 are open they disconnect the cache banks B0-B7 150, 152, 154, 156, 158, 160, 162 and 164 from the direct connections 128 and 130 and thereby configure cache memories 118 and 120 to communicate over data connections 174, 176, 178, 180, 182, 184, 186 and 188. In this switch configuration, the cache reconfiguration input 148 configures the cache memories 118 and 120 to operate in the fused mode.

The detailed view of cache memories 118 and 120 further includes additional switches that provide an increase in cache memory size and associativity for the cache banks being accessed. The additional switches are 198, 101, 103 and 105 in cache memory 118 and 107, 109, 111 and 113 in cache memory 120. These switches are controlled either collectively or individually by the cache reconfiguration input 148. When the switches are closed the cache memory available for that specific cache bank will be doubled. For instance, if switch 198 is closed, the cache memory available at that cache bank will be B0 150 and B0a 150a. This configuration does not require a change in the number of cache lines for B0 150; therefore, an address mapping remains the same and the cache architecture 100 will not need to flush cache bank's B0 150 contents to lower level cache. Additionally, when the additional switches 198, 101, 103 and 105 in cache memory 118 and 107, 109, 111 and 113 in cache memory 120 are open, B0a-B7a 150a, 152a, 154a, 156a, 158a, 160a, 162a and 164a are powered down. As a result, the cache architecture 100 allows adaptive multi-core access to a wide variety of cache sizes and associativity.

Figure 2:
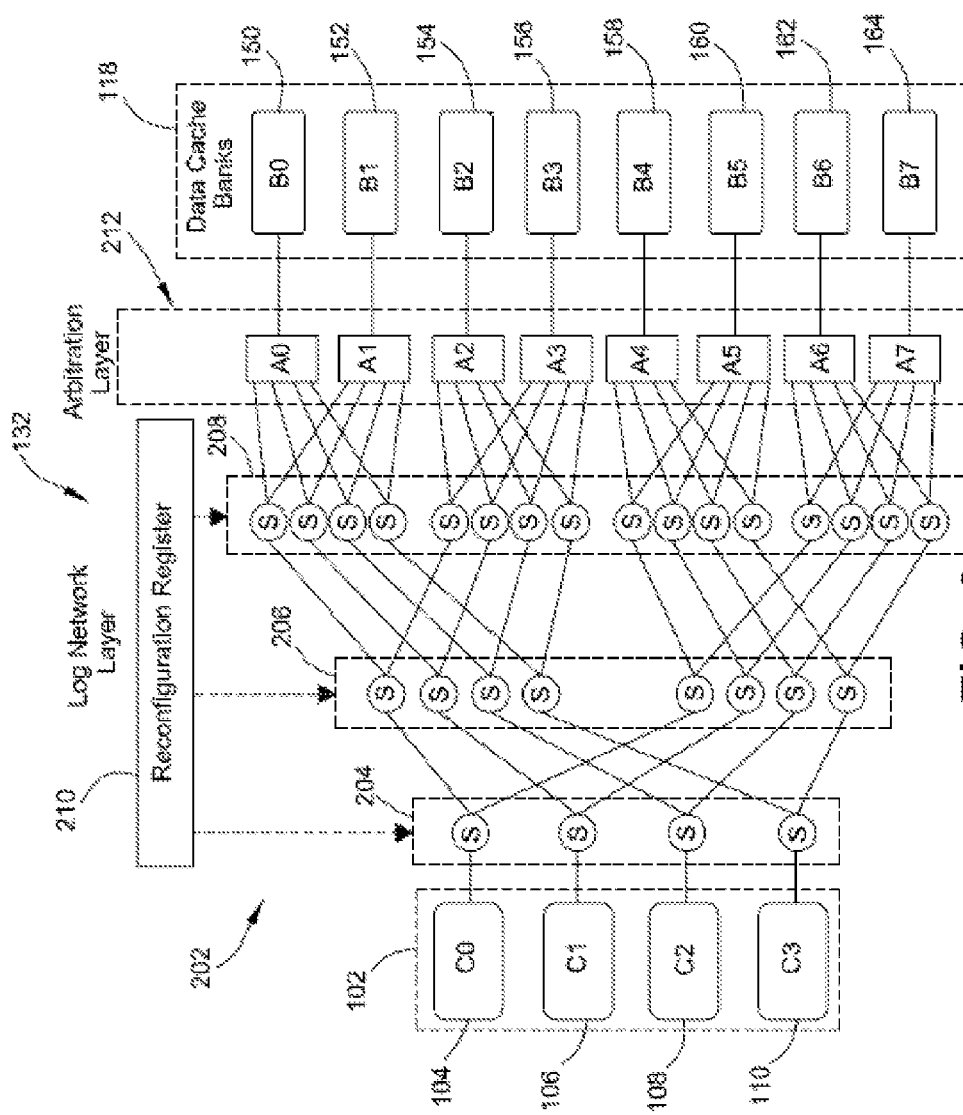
FIG. 2 is an illustration of an interconnection network of FIG. 1.

FIG. 2 illustrates a detailed view of the interconnect network 132 of FIG. 1. The interconnect network 132 is illustrated as being disposed between the multi-core processor 102 and the cache memory 118. In the illustrated embodiment, the interconnect network 132 comprises a combination routing network in the form of a log network 202. Log network 202 includes a plurality of switches S in switching layers. In the illustrated embodiment, the log network 202 includes three switching layers 204, 206 and 208. Switch layer 204 is a first switching layer, switch layer 206 is a second switching layer and switch layer 204 is a third switching layer. The number of switches in each switching layers grows exponentially from the first switching layer 204 through the third switching layer 208. In the illustrated embodiment, each subsequent switching layer includes twice as many switches as a previous switching layer, as illustrated with the four switches of the first switching layer 204, the eight switches of the second switching layer 206 and the sixteen switches of the third switching layer 208.

As an aside, the number of switches in the first switching layer 204 is defined based on a quantity of cores the interconnect network 132 is required to service. As illustrated in FIG. 2, the multi-core processor 102 includes four cores 104, 106, 108 and 110, which correspond to the four switches of the first switching layer 204. Accordingly, more or less cores in the multi-core processor 102 associated with a particular interconnect network 132 will produce more or less switches in a first switching layer 204, which will translate into more or less switches in the subsequent switching layers, or no subsequent switching layers depending on the number of cores and associated cache banks.

The log network 202 further includes a reconfiguration register 210 that contains a memory address mapping used to control how data is routed through the switching layers 204, 206 and 208 and, in certain embodiments, is issued from a central processor (not illustrated) of the multi-core processor 102 (see FIG. 1). In other embodiments, the cores 104, 106, 108 and 110 of the multi-core processor 102 will generate the memory address mapping.

Figure 3:
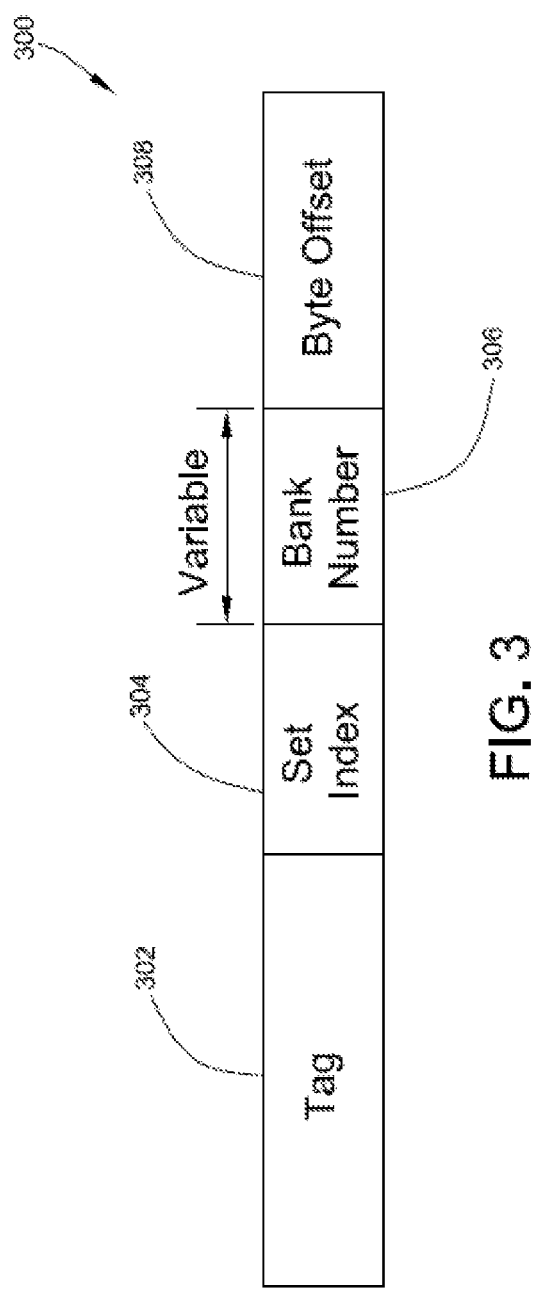
FIG. 3 is an illustration of an address mapping for the interconnection network of FIG. 2.

The memory address mapping 300 is illustrated in FIG. 3 and includes at least four fields including a tag 302, a set index 304, a bank number 306 and a byte offset 308. The byte offset 308 is used to select a byte from a particular cache bank's 150, 152, 154, 156, 158, 160, 162 or 164 cache line, and the set index 304 is used to select a bank's cache line. Also, while the tag 302, the set index 304 and the byte offset 308 are traditional fields in the address mapping 300 primarily directed to cataloging a memory address, the bank number 306 is a variable field used to guide data through the switching layers 204, 206 and 208 (see FIG. 2). In this regard, the bank number 306 provides an interleaved access through the log network 202. Also, as mentioned previously, the bank number 306 is a variable number. Accordingly, the bank number 306 will vary in length based on the network reconfiguration input 146 (see FIG. 1). The network reconfiguration input 146 is able to configure a number of cache banks utilized by increasing or decreasing a bit length of the bank number 306. As the bit length of the bank number 306 increases, so does the number of utilized cache banks, and as the bit length of the bank number 306 decreases, so does the number of utilized cache banks.

As an aside, typical sizes of the fields of the address mapping 300 for an embodiment of the interconnect network 132 as illustrated in FIG. 2 would be a byte offset 308 length of six bits in a cache line of 64 bytes, a max of three bits for bank number 306 used for accessing a cache bank through the interconnect network 132, and a set index 304 three bits in length for accessing the cache memory in a four kilobyte (KB), eight way set associative cache bank. The values of the fields of the address mapping 300 can change depending on the specific embodiment of the cache architecture utilized.

Returning now to FIG. 2, an arbitration layer 212 is further included in the interconnect network 132. In the illustrated embodiment, the arbitration layer 212 includes an arbitration node A0-A7 associated on a one-to-one basis with each cache bank B0-B7 of the cache memory 118; however, in other embodiments, more or less cache banks may be associated with a single arbitration node. In FIG. 2, each arbitration node A0-A7 includes four inputs, one for each core C0-C3 of the multi-core processor 102, and one output to the respective cache bank B0-B7. Each arbitration node A0-A7 decides cache bank B0-B7 contentions that occur whenever multiple cores C0-C3 attempt to access the same cache bank. The arbitration node will decide the contention by granting one input out of the four inputs and consuming one extra stage in accessing the cache bank by introducing one extra cycle.

Regarding the address mapping and memory request routing through the log network 202, the illustrated interconnect network 132 of the cache architecture 100 (see FIG. 1) allows coalition of the cores of the multi-core processor 102 to share the same amount of cache used by cores in private mode with minimal area, energy and performance overhead. The illustrated interconnect network 132 for the cache architecture 100 is configured to connect the cores of the multi-core processor 102 to a different number of cache memory banks, such as cache banks B0-B7 of cache memories 118 and 120, as illustrated in FIG. 2. In the illustrated embodiment of FIG. 2, four cores 104, 106, 108 and 110 of the multi-core processor 112 are connected to two cache memories 118 and 120 including eight cache banks B0-B7 150, 152, 154, 156, 158, 160, 162 and 164.

In FIG. 2, each switch of each switching layer 204, 206 and 208 includes a single input and two outputs. The data to be written to cache memory 118 is sent to the switch in the single input connection and is routed through the network through either a first direction or a second direction from the two outputs. For ease of description, the first direction output will represent the output connection traveling upwards, as illustrated in FIG. 2, and will be called the up direction, and the second direction will represent the output connection traveling downwards, as illustrated in FIG. 2, and will be called the down direction. Further, each bit of the bank number 306 (see FIG. 3) corresponds to a switching layer 204, 206 or 208 and acts as a controlling bit for that layer. For instance, in one embodiment, the bank number 306 is three bits in length, and the most significant bit corresponds to the first switching layer 204, the second most significant bit corresponds to the second switching layer 206, and the least significant bit corresponds to the third switching layer 208. As data is routed to the various switches in the various layers, a value of the controlling bit will determine whether the data is routed through the switch in the up or down direction (first or second direction, respectively). In one embodiment, if the value of the controlling bit is a 0, then the data is routed in the up direction, if the value of the controlling bit is a 1 or simply any value other than a 0, then the data will be routed in the down direction. To simplify further discussion, this embodiment will be referred to as traditional data routing. In other embodiments, the directional routing is the opposite in that a value of 1 will route data in the up direction, and a value of 0 will route data in a down direction.

As an aside, in certain embodiments, there are two such interconnect networks 132 for each cache memory M0-M3 114, 116, 118 and 120 (see FIG. 1). One interconnect network 132 connected to the multi-core processor's 102 write port for each core and for writing data to the cache memory (as illustrated in FIGS. 1 and 2), and one interconnect network (not illustrated) for reading data from the cache memory to the read port of each core of the multi-core processor 102. In the case of the interconnect network for the read port of the cores of the multi-core processor 102, the interconnect network will be the image of the interconnect network 132 and operate similarly. Therefore, the read interconnect network was not illustrated for the purpose of simplicity in the drawings. Additionally, regarding the arbitration layer associated with the interconnect network for the read port, in the rare event that read operations from multiple cache banks reply at the same time to a core of the multi-core processor 102, the final switching layer prior to entering the read port of the core of the multi-core processor 102 will make an arbitration decision that randomly selects one of the read requests and sends it to the read port of the core of the multi-core processor while the denied request to read data in set to pending in the output queue at a cache bank level of the associated cache bank.

Figure 4:
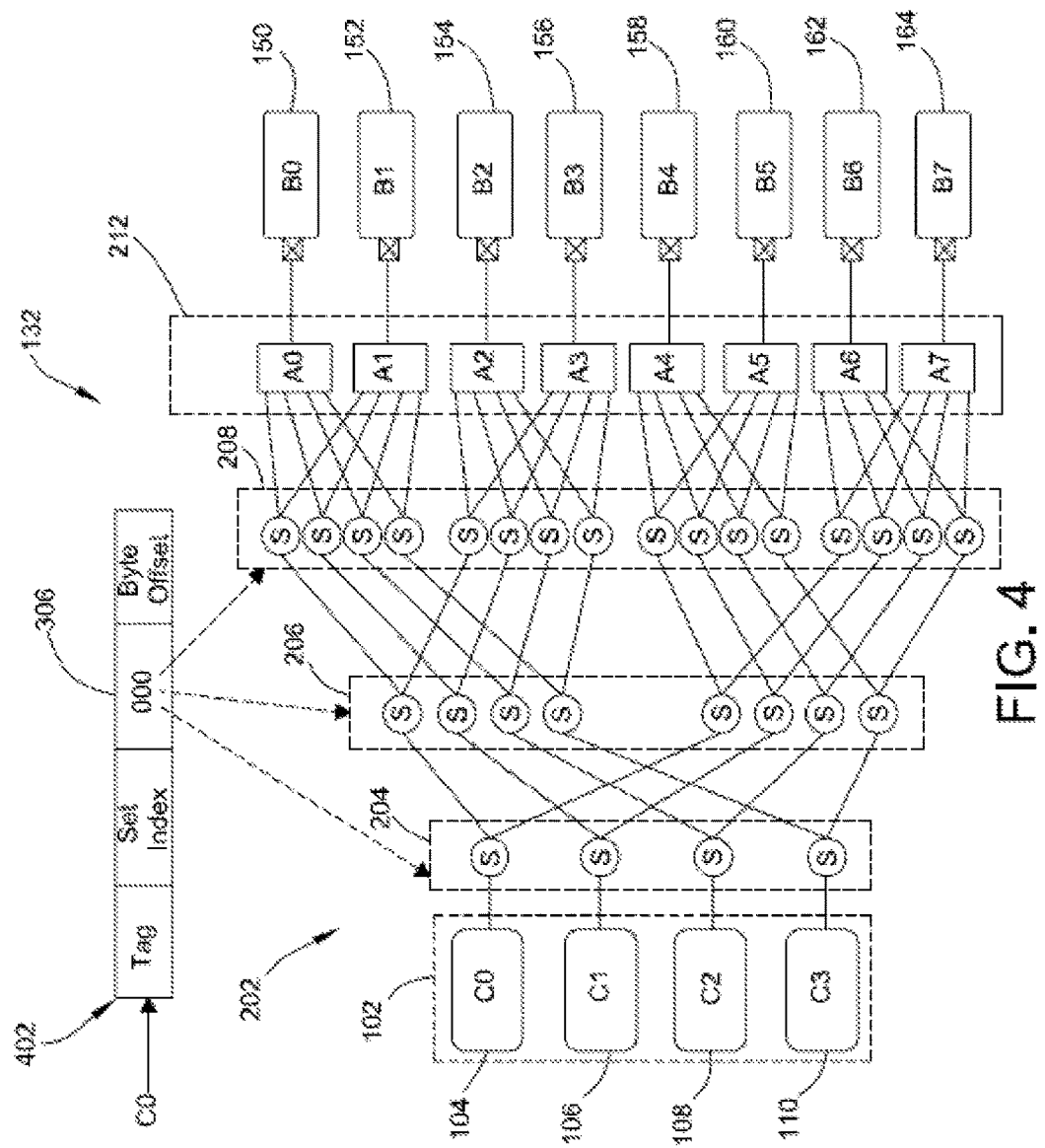
FIG. 4 is an illustration of the interconnection network of FIG. 2 according to an example embodiment.

Turning to FIG. 4, an example embodiment of data being routed through the interconnect network 132 is illustrated. In the example of FIG. 4, an example memory address mapping 402 from core C0 104 associated with routing data from the write port of the core 104 to cache bank B0 150. As illustrated, the bank number 306 has a value of 000, which corresponds to configuring the interconnect network 132 to have three switching layers 204, 206 and 208, one for each digit of the bank number 306, and to route the data in the up direction through each layer in order to reach the arbitration layer 212 at arbitration node A0. Once the data reaches the arbitration node A0, assuming no other data is assigned to be written to cache bank B0 150 at the same time, the arbitration node A0 passes the data to the cache bank B0 150 to be written. If data is present on one of the other terminals connected as an input into arbitration node A0, then the arbitration layer makes a decision on what data to pass to the cache bank B0 150.

As mentioned above, the interconnect network 132 can be configured and reconfigured by adjusting the bank number 306 based on a desired number of cache banks for a specific application running at a core of the multi-core processor 102. In the example of FIG. 4, core C0 104 determines it needs access to eight cache banks B0-B7. Therefore, the bank number 306 corresponds to a binary number capable of addressing the eight separate cache banks B0-B7. If C0 104 needed access to more or less cache banks, then the bank number 306 could be adjusted to include more or less digits in order to increase or decrease the number of switching layers. Further, during a network reconfiguration, when the address mapping is changed for creating a different coalition of cores, in certain embodiments, the shared cache corresponding to the cores involved in the coalition must be flushed to lower level cache.

In one embodiment, each switch S in the interconnect network 132 includes two control bits used to set a state of the switch, which are set by the network reconfiguration input 146 (see FIG. 1). These two control bits are utilized to set the switch to one of three states, a first state, a second state and a third state. The first state is a normal mode, which means that the switch operates according to the relevant digit of the bank number 306, as described above. The second state is an always up state, which configures the switch to always route the data traversing the switch in the up direction. And the third state is the always down state, which configures the switch to always route the data traversing the switch in the down direction. In one embodiment, the two control bits for the switch in the first state could be 00, the two control bits in the second state could be 01 and the two bits in the third state could be 10.

Therefore, the state of the switch is determined based on the total width or number of digits of the bank number 306 (see FIG. 3). If the core, such as core C0 104 in FIG. 4, needs to have access to all eight cache banks B0-B7, as illustrated, then the switches of all three illustrated switching layers will be configured in the normal mode such that data is routed according to the value of the respective digit in the bank number 306. However, if the bank number 306 has a width of less than three digits, then to decrease the number of switching layers, the switches are configured to operate in an always up or always down mode based on what cache banks B0-B7 are desired.

Figure 5:
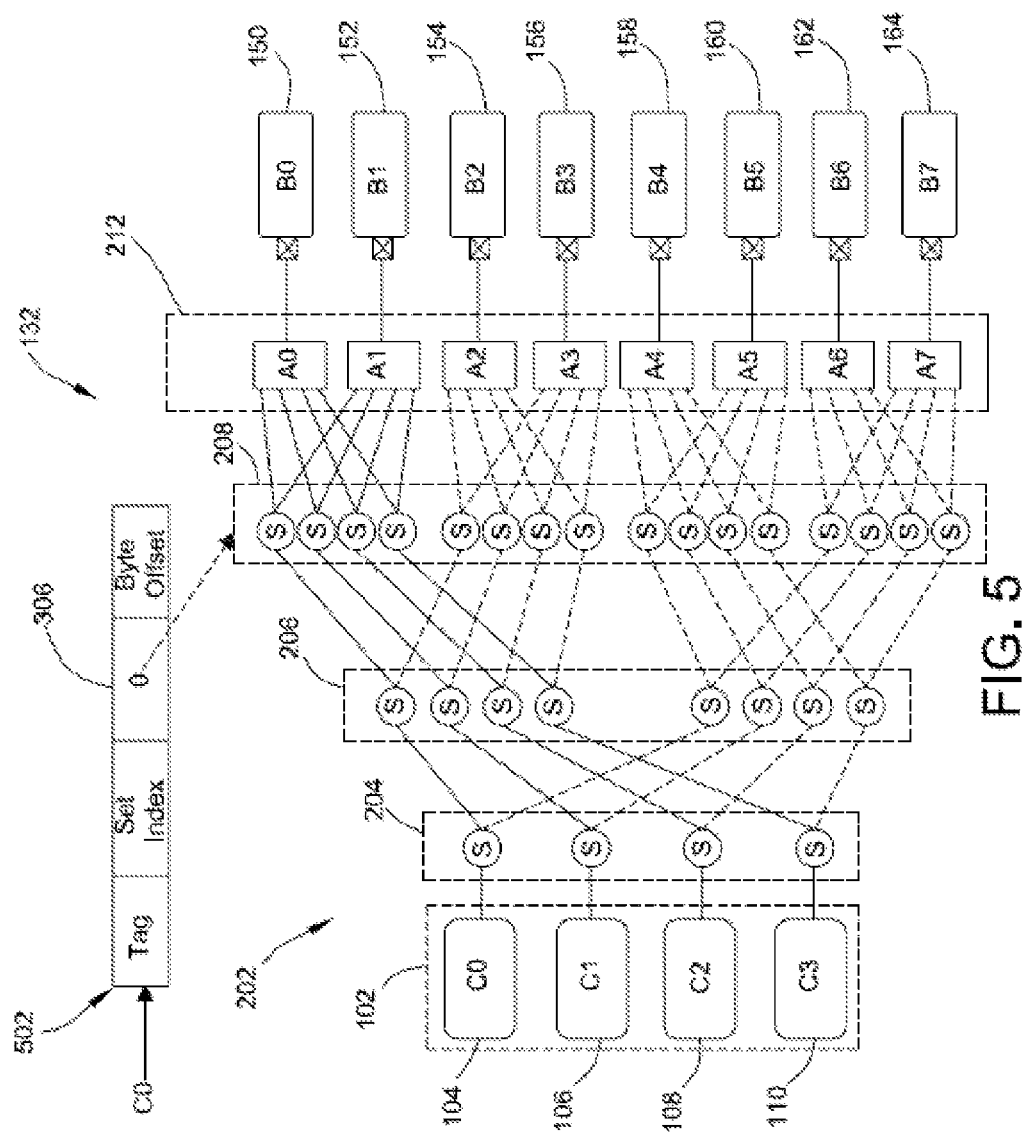
FIG. 5 is an illustration of the interconnection network of FIG. 2 according to an example embodiment.

FIG. 5 illustrates an example where core C0 104 only desires access to cache banks B0 and B1 150, 152. This is illustrated by a memory address mapping 502, which includes a bank number 306 with a length of only a single digit. The single digit represents the third switching layer 208. In this example embodiment, the first two switching layers 204, 206 are configured such they route data in the always up direction. Therefore, every switch in those layers is configured in the always up or second state by setting the control bits for each switch to a 01. In this manner, the interconnect network 132 can have a plurality of different configurations that enable a different number of cache banks B0-B7. Such a scheme is capable of achieving a flexible and reconfigurable cache architecture.

Further, in the illustrated embodiment of FIG. 5, the value of the bank number is 0. Therefore, the data will be written to cache bank B0 150. However, the value could have been a 1, and then the data would have been written to cache bank B1 152.

Figure 6:
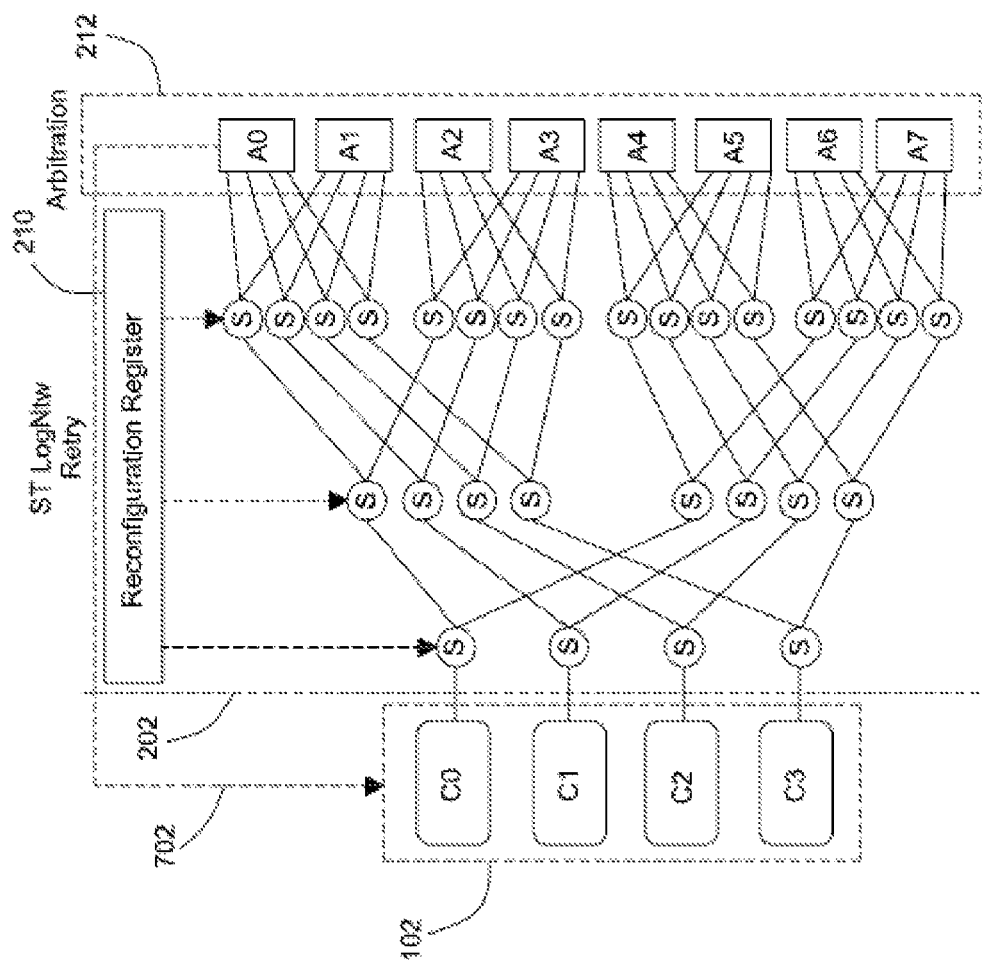
FIG. 6 is an illustration of a retry message sent from an interconnection network to a core of the multi-core processor according to an embodiment of the invention.
Figure 7:
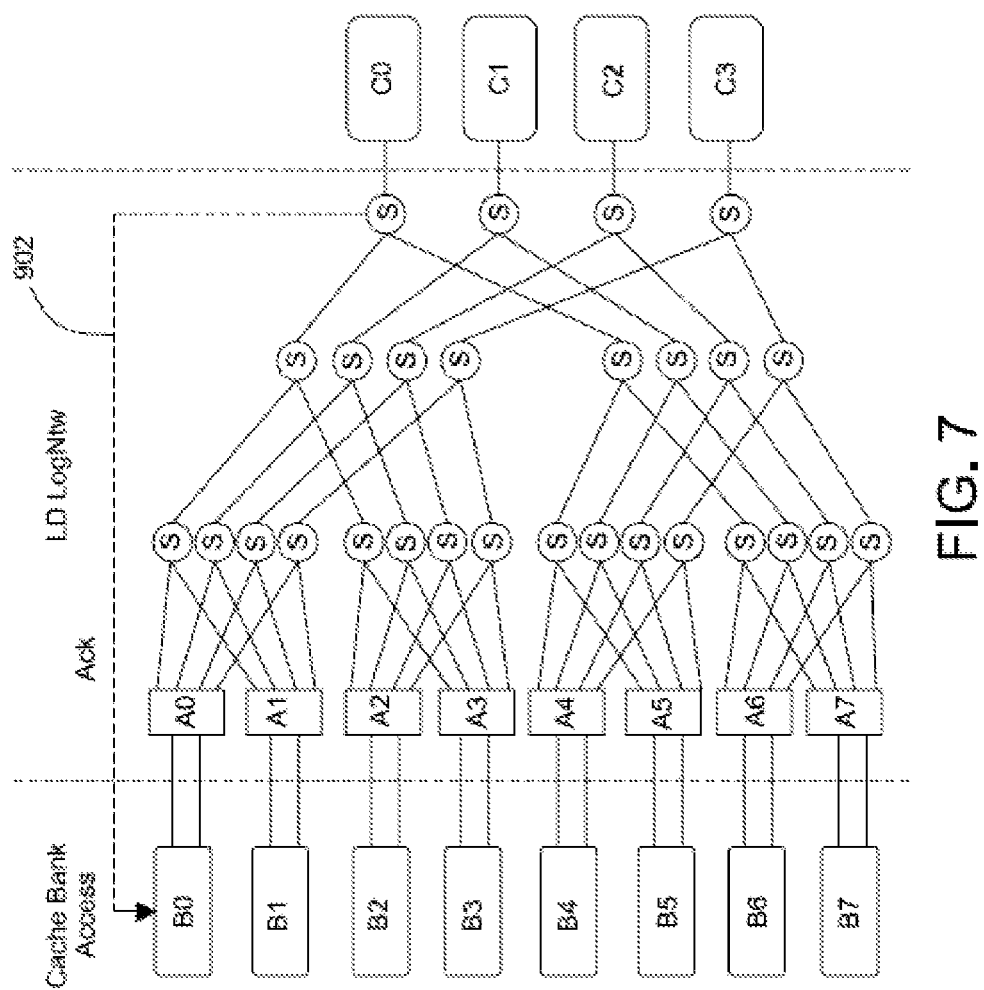
FIG. 7 is an illustration of a acknowledge message from a core to a cache bank according to an embodiment of the invention.

FIGS. 6 and 7 illustrate retry and acknowledge mechanisms, respectively, for the cache architecture 100 (see FIG. 1) configured in the fused mode. Specifically, FIG. 6 illustrates the arbitration decision being made by the arbitration level 212. In the example illustrated in FIG. 6, arbitration node A0 receives multiple cache memory write requests simultaneously. However, the arbitration node A0 can only accept one such request at a time. Accordingly, one write request is granted and the other write request is denied. The arbitration node A0 then sends a retry request 602 back to the core that sent the rejected write request, which in the illustrated example of FIG. 6 is core C0 104.

FIG. 7 illustrates an acknowledge signal for the cache architecture 100 (see FIG. 1). In the illustrated example, the specific switch within the first switching layer 204 (see FIG. 2) associated with a specific individual core C0-C4 transmits an acknowledge signal 702 to a specific individual cache bank B0-B7 to provide notice of the completion of the memory access transaction such that the cache bank B0-B7 can remove the outstanding transaction record.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An interconnect device configured to communicatively couple a multi-core processor to a plurality of cache memories each comprising a plurality of cache banks, the interconnect device comprising:
   a log network layer comprising a plurality of switching layers, wherein a first switching layer comprises a plurality of switches and each subsequent switching layer comprises twice as many switches as the previous switching layer;
   a network reconfiguration register configured to store an address mapping for routing data processed by the multi-core processor through the log network layer; and
   an arbitration layer coupling the log network layer to the plurality of cache banks,
   wherein the arbitration layer comprises an individual arbitration node for each cache bank of the plurality of cache banks, and each of the individual arbitration nodes has one input for each core of the multi-core processor and one output to the cache bank, and
   wherein the individual arbitration node is configured to determine what data is written to the cache bank in the event that more than one core of the multi-core processor attempts to write the data to the cache bank at the same time.

2. The interconnect device of claim 1, wherein the address mapping comprises a binary number where each digit of the binary number corresponds to an individual switching layer of the plurality of switching layers, and each switch of the individual switching layer is configured to route the data processed by the multi-core processor one of a first direction and a second direction to the subsequent switching layer based on a value of the digit corresponding to the individual switching layer.

* * * * *